Jan. 13, 1959

A. Z. PANASEWICZ 2,868,579

PUSH PLATE ASSEMBLY

Filed Nov. 30, 1956

INVENTOR.
Anton Z. Panasewicz
BY
R. T. Barnard
ATTORNEY

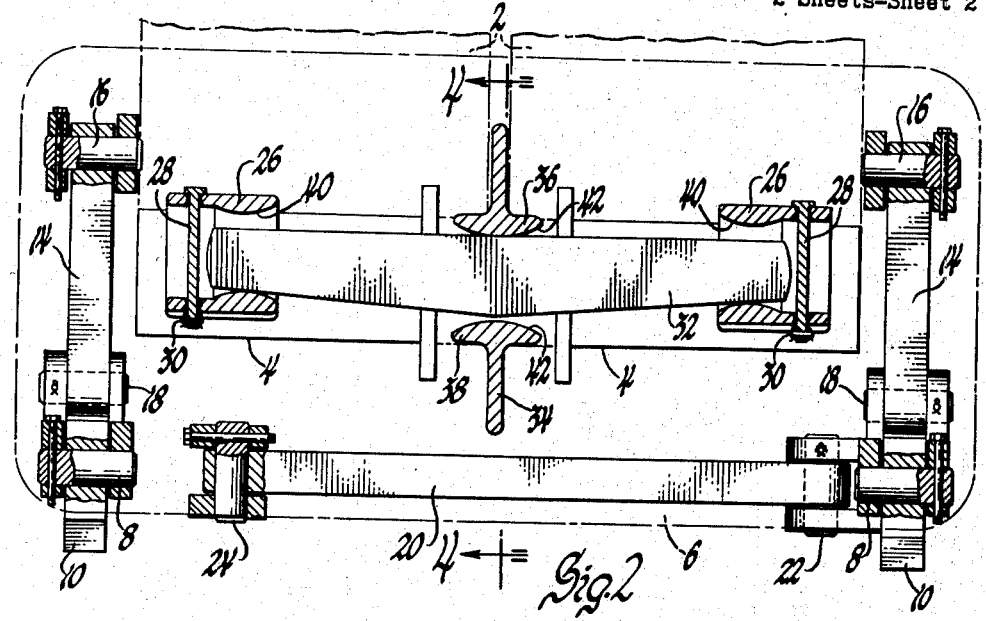
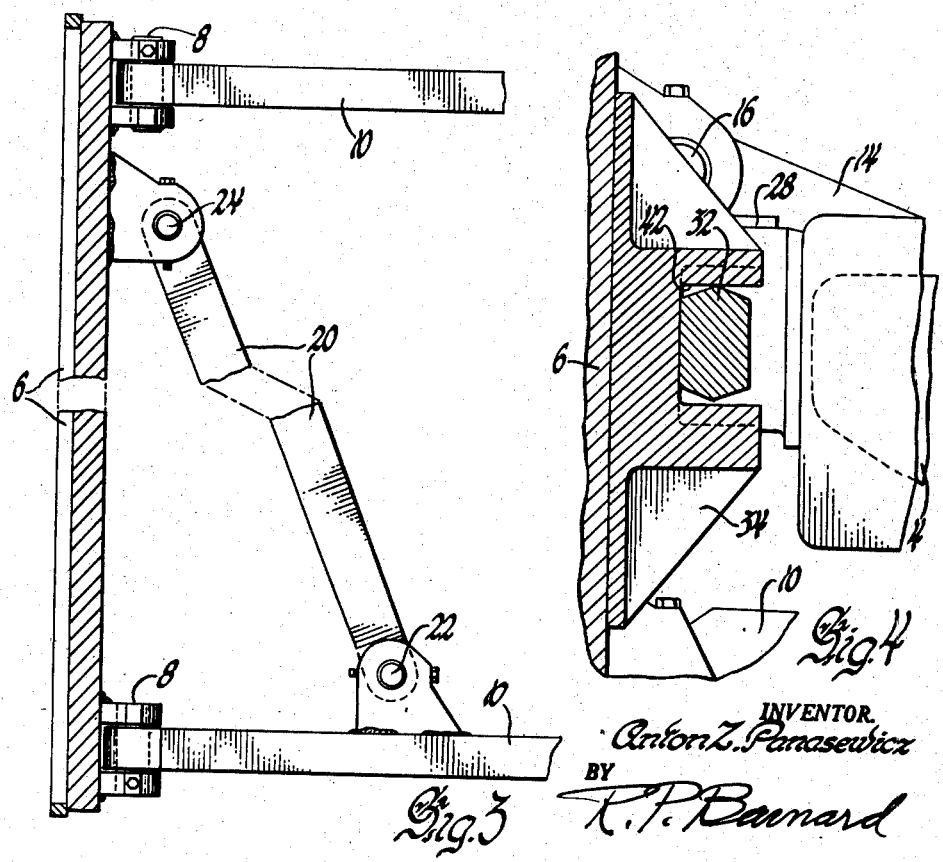

United States Patent Office 2,868,579
Patented Jan. 13, 1959

2,868,579

PUSH PLATE ASSEMBLY

Anton Z. Panasewicz, Parma, Ohio, assignor to General Motors Corporation, Detroit, Mich., a corporation of Delaware Application November 30, 1956, Serial No. 625,516

10 Claims. (Cl. 293—60)

The present invention relates to a means for mounting an attachment at the front end of a track laying vehicle of the type having two spaced tractor halves or frames which are operatively related for relative oscillatory movement in a substantially vertical plane.

In mounting attachments at either end of a track laying vehicle having two oscillating portions, a problem is presented in so-mounting the attachment relative to the oscillating tractor portions so as to accommodate such movement. In crawler tractors of the type herein disclosed, and as shown in the copending application of Russell C. Williams, S. N. 455,903 filed September 14, 1954, the two complementary tractor halves are independently powered and may oscillate relative to each other as the twin-powered unit travels over the ground. This feature of relative oscillation between the tractor halves allows each tractor half to remain in driving engagement with the terrain although the latter is of irregular contour. By way of interest, if the tractor halves were not capable of relative oscillation, one or the other track of the vehicle may be lifted off the ground at least in part as the vehicle travels over such terrain.

It is desirable at times to mount an attachment on this type of vehicle. Such an attachment as particularly contemplated herein may be a push plate extending transversely across the front of the vehicle. Such push plates are commonly used as a type of bumper to engage the rear end of another vehicle so that the tractor so equipped may aid in propelling the vehicle along the ground. It will be readily apparent that such attachments are subjected to extremely heavy loads and severe abuse. Moreover, a particular problem is presented when such a push plate is mounted on a track laying vehicle of the type herein described because of the fact that the two complementary tractor halves thereof oscillate relative to each other about a pivot shaft intermediate the ends of the vehicle. As a consequence of such oscillation, the forward ends of the vehicle halves swing in arcs toward and away from each other.

Within the scope of this invention, a mounting structure for a crawler tractor attachment is contemplated in which the attachment may accommodate the aforedescribed relative vehicle oscillation.

The principal feature of this invention resides in the fact that a transversely extending cross beam is confined by suitable mounting means carried by the respective tractor halves in such a manner as to permit the beam to rotate in more than one plane as the tractor halves oscillate. Moreover, a push plate is secured to the respective tractor halves by laterally spaced longitudinally extending push beams which are pivotally connected at their rear ends to the respective tractor halves to maintain a bracket carried by the push plate in operative relationship with the cross beam to suspend the push plate therefrom.

More specifically, it is a primary object of this invention to equip a track laying vehicle of the type described with a push plate and a mounting assembly therefor comprising, laterally spaced mounting sockets carried by the respective tractor halves and between which there is confined for rotative movement in more than one plane a cross beam on which there is suspended a bracket secured to the push plate, the push plate being secured against substantial longitudinal shifting movement away from the cross beam by conventional spaced push beams pivotally connected to the respective tractor halves.

These and other features, objects and advantages will appear more fully hereinafter as the description of the invention proceeds and in which reference is made to the following drawings in which:

Figure 1 is a side elevation of a push plate mounted on the front end of a crawler tractor;

Figure 2 is a cross section along line 2—2 of Figure 1 and shows the preferred means of mounting the push plate;

Figure 3 is a cross section along line 3—3 of Figure 1 to more clearly show the bracing structure for the push plate.

Figure 4 is a cross section along line 4—4 of Figure 2.

Referring now to the drawings, there is shown a twin unit track laying vehicle having laterally spaced complementary tractor halves 2 which are operatively pivotally associated by a transversely extending pivot shaft intermediate the ends of the unit as is disclosed in the aforementioned copending application. Each tractor half 2 has a suitable bumper 4, which bumpers move relative to each other arcuately in a substantially vertical plane as the respective tractor halves pivot about their interconnecting pivot shaft. A push plate 6 is connected by pins 8 at laterally spaced points along the lower edge thereof to the forward ends of longitudinally rearwardly extending spaced push beams 10 which are operatively pivotally connected to the respective tractor halves by universal joint connections 12. Rigid reinforcing struts 14 are connected at their ends between the upper portions of the push plate by pins 16 and to a portion of each push beam intermediate the latter's length by pins 18. Furthermore, another reinforcing rigid strut 20 may extend forwardly and laterally between a forward portion of one push beam 10 and the lower edge of the push plate near the connection of the latter with the other push beam pins 22 and 24 respectively connecting the strut 20 to these members. It will, therefore, be seen that the push beam and strut structures provide a great degree of reinforcement for the push plate.

Referring now to the means for mounting the push plate so as to accommodate the aforedescribed oscillatory movement of the tractor halves, the bumpers 4 of the respective tractor halves each may be seen to have mounted thereon an inwardly opening substantially rectangular shaped socket 26. Each socket is provided with, near its outboard end and in the vertically spaced walls thereof, an elongated aperture into which a plate 28 may be dropped and removably secured by a pin 30. A cross beam 32 extends laterally between and has its ends respectively confined within the socket members 26. It will be noted that the ends of the cross beam are substantially smaller in size than is the cavity within the sockets thereby providing a loose fit, although it will be appreciated that the length of the cross beam is so selected relative to the degree of oscillation of the tractor halves to insure that the cross beam is always confined between the socket members. To the rear face of the push plate there is rigidly secured near the mid-point thereof a bracket 34 having a substantially U-shaped center portion formed between vertically spaced rearwardly projecting upper and lower bracket legs 36 and 38. It will be again noted that the opening formed by the bracket is larger than the portion of the cross beam suspended within it.

The internal surfaces 40 of the socket members have an arcuate bearing surface which may be engaged by a similar bearing surface on the cross beam. Moreover, the rearwardly extending vertically spaced bracket legs 36 and 38 which suspend the push plate from the cross beam have similar arcuate surfaces 42 thereon. The arcuate bearing surfaces may be spherical or cylindrical in form or any other configuration which will more readily accommodate the relative rotary and sliding movement occurring between the sockets, cross beam and push plate bracket.

It may be noted that although the push plate is described as being suspended from the cross beam by a rearwardly opening bracket, this bracket could also take the form of a rectangular socket having laterally spaced openings therein through which the cross beam may project. Furthermore, the socket members could be of a configuration similar to the mounting bracket, but with the opening thereof presented forwardly inasmuch as the push beam and strut structure will maintain the push plate bracket against the cross beam thereby maintaining the ends of the latter firmly seated in such a bracket construction.

It may, therefore, be seen that as the tractor halves oscillate, the sockets mounted thereon will move in arcs relative to each other about the pivotal connection of the tractor halves. In so moving, the sockets actually move toward and away from each other, which movement is accommodated by the ends of the cross beam sliding within the sockets and, in effect, the cross beam rotating or oscillating in various planes as defined by the relative position of the tractor halves. As the cross beam moves in this manner, the mid-portion of the cross beam will move to a lesser extent than the extremities thereof and it is desirable, although not necessary, that the bracket engage the cross beam at this point. The arcuate bearing surfaces of the bracket will therefore accommodate the relative movement of the cross beam, while the push beam and strut structure will maintain the push plate in a substantially vertical plane although the latter may shift vertically to some extent.

Referring to Figure 2, the ends of the cross beam are shown as engaging the arcuate bearing surfaces in the lower walls of the respective supporting sockets, the mid-portion of the cross beam being engaged by the bearing surface of the upper bracket leg 36 to suspend the push plate therefrom. Normally, the push plate will remain in this position; however, there is a degree of play within the bracket so that the push plate may move vertically upwardly to maintain a firm pushing engagement with a vehicle as the latter goes over humps thereby raising its rear bumper to some extent.

Although the present invention has been applied to a push plate attachment, it will be readily apparent that the same type of mounting assembly may be employed for other attachments to such an oscillating structure. Furthermore, although the mounting assembly has been shown in combination with a twin-powered unit crawler tractor, it will be further apparent that such a mounting assembly may be easily adapted to a conventional crawler tractor of the type having two laterally spaced relatively oscillating track roller frames.

I claim:

1. In combination with a vehicle of the type including two spaced tractor frames operatively related for relative oscillatory movement in substantially vertical parallel planes and having an attachment mounted at one end thereof, means for supporting said attachment from said tractor frames whereby said attachment accommodates the relative oscillatory movement between said frames; said means comprising, laterally spaced sockets mounted on said frames, a cross beam extending between said frames and having the ends thereof loosely confined within the respective sockets, a bracket secured to said attachment, said bracket being loosely mounted about said cross beam, and spaced push beams each having one end pivotally mounted to a tractor frame and the other end secured to said attachment to retain the latter on said cross beam.

2. In combination with a vehicle of the type including two spaced tractor frames operatively related for relative oscillatory movement in substantially vertical parallel planes and having an attachment mounted at the forward end thereof, means for supporting said attachment from said tractor frames whereby said attachment accommodates the relative oscillatory movement between said frames; said means comprising, laterally spaced inwardly opening sockets mounted on said frames, a cross beam extending between said frames and having the ends thereof loosely confined within the respective sockets, a bracket secured to the rear face of said push plate and loosely mounted about said cross beam intermediate said sockets, and spaced longitudinally extending push beams each having one end pivotally mounted to a tractor frame and the other end secured to said push plate to retain the latter on said cross beam, whereby said cross beam may rotate in more than one plane as said frames oscillate and said push plate may move in a substantially vertical plane as said cross beam rotates.

3. In combination with a vehicle of the type including two spaced tractor halves operatively related for relative oscillatory movement in substantially vertical parallel planes and having a push plate mounted at the forward end thereof, means for supporting said push plate from said tractor halves whereby said push plate accommodates the relative oscillatory movement between said halves; said means comprising, laterally spaced inwardly opening sockets mounted on said halves, a cross beam extending between said halves and having the ends thereof loosely confined within the respective sockets, a rearwardly opening bracket secured to the rear face of said push plate, said bracket having vertically spaced rearwardly extending legs loosely mounted about said cross beam intermediate said sockets, and spaced longitudinally extending push beams each having one end pivotally mounted to a tractor half and the other end secured to said push plate to retain the latter on said cross beam, whereby said cross beam may rotate in more than one plane relative to said bracket as said frames oscillate.

4. In combination with a vehicle of the type including two spaced tractor halves operatively related for relative oscillatory movement in substantially vertical parallel planes and having a push plate mounted at the forward end thereof, means for supporting said push plate from said tractor halves whereby said push plate accommodates the relative oscillatory movement between said halves; said means comprising, laterally spaced inwardly opening sockets mounted on said halves, a cross beam extending between said halves and having the ends thereof loosely confined within the respective sockets, a rearwardly opening bracket secured to the rear face of said push plate, said bracket having vertically spaced rearwardly extending legs loosely mounted about said cross beam intermediate said sockets, said sockets and bracket legs having curved bearing surfaces for engagement by said cross beam, and spaced longitudinally extending push beams each having one end pivotally mounted to a tractor half and the other end secured to said push plate to retain the latter on said cross beam, whereby said cross beam may rotate in more than one plane relative to said bracket as said frames oscillate.

5. In combination with a vehicle of the type including two spaced tractor frames operatively related for relative oscillatory movement in substantially vertical planes and having an attachment mounted at one end thereof, means for supporting said attachment from said frames whereby said attachment accommodates the relative oscillatory movement between said frames; said means comprising laterally spaced sockets mounted on said frames, a cross beam extending between said frames and having the ends thereof loosely confined within the respective sockets, a rearwardly opening bracket secured to said push plate, said bracket being loosely mounted about said cross beam intermediate said sockets, spaced longitudinally extending push beams each having one end pivotally mounted to a tractor frame and the other end secured to the lower edge of said attachment at laterally spaced points, a reinforcing strut extending between the upper edge of said attachment and each of said push beams, whereby said cross beam may rotate in more than one plane as said frames oscillate and move angularly relative to said attachment.

6. In combination with a vehicle of the type including two spaced tractor halves operatively related for relative oscillatory movement in substantially vertical parallel planes and having a push plate mounted at the forward end thereof, means for supporting said push plate from said halves whereby said push plate accommodates the relative oscillatory movement between said halves; said means comprising laterally spaced inwardly opening sockets mounted on said halves, a cross beam extending between said halves and having the ends thereof loosely confined within the respective sockets, a rearwardly opening bracket secured to the rear face of said push plate and loosely mounted about said cross beam intermediate said sockets, said sockets having curved bearing surfaces for said cross beam, spaced longitudinally extending push beams each having one end pivotally mounted to a tractor half and the other end secured to the lower edge of said push plate at laterally spaced points, a reinforcing strut extending between the upper edge of said push plate and each of said push beams, a laterally and forwardly extending reinforcing strut connected between one of said push beams and the lower edge of said push plate near the connection of the latter with the other push beam, whereby said cross beam may rotate in more than one plane as said frames oscillate and move angularly relative to said push plate.

7. In combination with a vehicle of the type including two spaced tractor halves operatively related for relative oscillatory movement in substantially vertical parallel planes and having a push plate mounted at the forward end thereof, means for supporting said push plate from said halves whereby said push plate accommodates the relative oscillatory movement between said halves; said means comprising laterally spaced inwardly opening sockets mounted on said halves, a cross beam extending between said halves and having the ends thereof loosely confined within the respective sockets, a rearwardly opening bracket secured to the rear face of said push plate, said brackets having vertically spaced rearwardly extending legs loosely mounted about said cross beam intermediate said sockets, said sockets and bracket legs having curved bearing surfaces for said cross beam, spaced longitudinally extending push beams each having one end pivotally mounted to a tractor half and the other end secured to the lower edge of said push plate at laterally spaced points, a reinforcing strut extending between the upper edge of said push plate and each of said push beams, a laterally and forwardly extending reinforcing strut connected between one of said push beams and the lower edge of said push plate near the connection of the latter with the other push beam, whereby said cross beam may rotate in more than one plane as said frames oscillate and move angularly relative to said push plate.

8. In combination with a vehicle of the type including two spaced tractor halves operatively related for relative oscillatory movement in substantially vertical parallel planes and having a push plate mounted at the forward end thereof, means for supporting said push plate from said tractor halves whereby said push plate accommodates the relative oscillatory movement between said halves; said means comprising, laterally spaced inwardly opening sockets mounted on said halves, removable plates forming a closure for the outboard ends of said sockets, a cross beam extending between said halves and having the ends thereof loosely confined between said plates within the respective sockets, a rearwardly opening bracket secured to the rear face of said push plate, said bracket having vertically spaced rearwardly extending legs loosely mounted about said cross beam intermediate said sockets, and spaced longitudinally extending push beams each having one end pivotally mounted to a tractor half and the other end secured to said push plate to retain the latter on said cross beam, whereby said cross beam may rotate in more than one plane as said frames oscillate and move angularly relative to said push plate within the bracket secured thereto.

9. In combination with a vehicle of the type including two spaced tractor halves operatively related for relative oscillatory movement in substantially vertical parallel planes and having a push plate mounted at the forward end thereof, means for supporting said push plate from said halves whereby said push plate accommodates the relative oscillatory movement between said halves; said means comprising laterally spaced inwardly opening sockets mounted on said halves, removable plates forming a closure for the outboard ends of said sockets, a cross beam extending between said halves and having the ends thereof loosely confined between said plates within the respective sockets, a rearwardly opening bracket secured to the rear face of said push plate, said bracket having vertically spaced rearwardly extending legs loosely mounted about said cross beam intermediate said sockets, said sockets and bracket legs having curved bearing surfaces for said cross beam, spaced longitudinally extending push beams each having one end pivotally mounted to a tractor half and the other end secured to the lower edge of said push plate at laterally spaced points, a reinforcing strut extending between the upper edge of said push plate and each of said push beams, a laterally and forwardly extending reinforcing strut connected between one of said push beams and the lower edge of said push plate near the connection of the latter with the other push beam, whereby said cross beam may rotate in more than one plane as said frames oscillate and move angularly relative to said push plate.

10. In combination with a vehicle of the type including two spaced tractor frames operatively related for relative oscillatory movement in substantially vertical parallel planes and having an attachment mounted at one end thereof, means for supporting said attachment from said tractor frames whereby said attachment accommodates the relative oscillatory movement between said frames; said means comprising laterally spaced supports mounted on said frames, a cross beam extending between said frames and having the ends thereof movably mounted on said supports, said attachment being mounted on said cross beam and movable relative thereto, and spaced push beams each having one end pivotally mounted to a tractor frame and the other end secured to said attachment to retain the latter on said cross beam.

References Cited in the file of this patent

UNITED STATES PATENTS 400,950   Roberts et al. _____ Apr. 9, 1899

UNITED STATES PATENT OFFICE

CERTIFICATE OF CORRECTION

Patent No. 2,868,579  January 13, 1959

Anton Z. Panasewicz

It is hereby certified that error appears in the printed specification of the above numbered patent requiring correction and that the said Letters Patent should read as corrected below.

Column 4, line 68, after "vertical" insert -- parallel --.

Signed and sealed this 12th day of May 1959.

(SEAL)
Attest:

KARL H. AXLINE
Attesting Officer

ROBERT C. WATSON
Commissioner of Patents